(12) United States Patent
Wycech

(10) Patent No.: US 7,175,230 B2
(45) Date of Patent: Feb. 13, 2007

(54) ENERGY ABSORBER, A METHOD FOR MAKING AN ENERGY ABSORBER, AND SEVERAL ITEMS WHICH INCLUDE SUCH AN ENERGY ABSORBER

(76) Inventor: Joseph S. Wycech, 927 Lake Shore Rd., Gross Pointe Shores, MI (US) 48236

( * ) Notice: Subject to any disclaimer, the term of this patent is extended or adjusted under 35 U.S.C. 154(b) by 26 days.

(21) Appl. No.: 11/050,299

(22) Filed: Feb. 3, 2005

(65) Prior Publication Data

US 2006/0170253 A1  Aug. 3, 2006

(51) Int. Cl.
*B60K 7/00* (2006.01)
(52) U.S. Cl. .................. 296/187.03; 296/214
(58) Field of Classification Search .......... 296/187.03, 296/214, 187.05
See application file for complete search history.

(56) References Cited

U.S. PATENT DOCUMENTS

| | | | | |
|---|---|---|---|---|
| 3,211,253 A | * | 10/1965 | Gonzalez | .................... 181/292 |
| 5,887,470 A | * | 3/1999 | Mirtsch | .......................... 72/57 |
| 6,682,128 B2 | * | 1/2004 | Carroll et al. | ......... 296/187.03 |
| 6,758,507 B2 | * | 7/2004 | Tarahomi et al. | ............ 293/120 |
| 2003/0197400 A1 | * | 10/2003 | Prisler et al. | ................ 296/214 |
| 2004/0178662 A1 | * | 9/2004 | Carroll et al. | ......... 296/187.03 |
| 2005/0040679 A1 | * | 2/2005 | Lipke et al. | ................ 296/214 |
| 2005/0161982 A1 | * | 7/2005 | Cormier et al. | ............. 296/214 |
| 2005/0200062 A1 | * | 9/2005 | Maurer et al. | ............. 267/144 |
| 2005/0269837 A1 | * | 12/2005 | Carroll et al. | ......... 296/187.03 |
| 2006/0066134 A2 | * | 3/2006 | Carroll et al. | ......... 296/187.03 |

* cited by examiner

*Primary Examiner*—Kiran B. Patel P. E.
(74) *Attorney, Agent, or Firm*—Law Offices of John Chupa & Associates, P.C.

(57) ABSTRACT

An energy absorber 10 which is made by a new and novel process and which includes beads, such as beads 12, 14, and 16 which are selectively coupled together and reside upon an elastomeric surface 90. The beads, such as beads 12, 14, and 16 are formed, in one non-limiting embodiment, from a ceramic material and provide enhanced energy absorption characteristics which allows the created energy absorber 10 to be selectively "programmed" to be operatively deployed in a wide range of environments.

7 Claims, 4 Drawing Sheets

ENERGY ABSORBER, A METHOD FOR MAKING AN ENERGY ABSORBER, AND SEVERAL ITEMS WHICH INCLUDE SUCH AN ENERGY ABSORBER

FIELD OF THE INVENTION

The present invention generally relates to an energy absorber, to a method for making an energy absorber, and to several tangible items which include such an energy absorber and more particularly, to an energy absorber which may be made by a highly efficient process and which provides enhanced energy absorption properties while being selectively adapted for use in several diverse types of tangible items.

BACKGROUND OF THE INVENTION

An energy absorber is typically used to absorb the energy which is imparted to a surface or substrate of an object, due to a collision or impact with another object or entity, thereby reducing the likelihood of damage to the colliding object or entity and, in many cases, concomitantly reducing the likelihood of damage to the object upon/within which the energy absorber is operatively deployed.

While such an energy absorber does provide the foregoing benefits, it is relatively costly to manufacture, e.g., (requires oil or is "oil based"), requires a relatively complex manufacturing process, and does not absorb a great deal of energy because it tends to become stiffer when it becomes dynamically compressed under a load. Further, the current energy absorber designs are not readily modifiable or "programmable" to be adapted for use in various diverse types of energy absorption environments and are not adapted for use in diverse types of tangible items due to their operative intolerance of heat and their relatively high cost and complex manufacturing process.

There is therefore a need for a new and improved energy absorber; for a new and improved method for making such an energy absorber; and for items which operatively include such an energy absorber. The present invention provides these improvements and needed benefits in a new and novel manner.

SUMMARY OF THE INVENTION

It is a first non-limiting object of the present invention to provide a energy absorber which overcomes some or all of the drawbacks of current energy absorbers, such as but not limited to those which have been previously delineated above.

It is a second non-limiting object of the present invention to provide a method for making an energy absorber which overcomes some or all of the drawbacks of current energy absorber creation/manufacturing methodologies, including but not limited to those drawbacks which have been delineated above.

It is a third non-limiting object of the present invention to provide items which include new and novel energy absorbers which are made in accordance with the teachings of the inventions.

According to a first non-limiting aspect of the present invention, an energy absorber is provided and includes a plurality of coated and coupled beads which are selectively coupled to form a certain shape.

According to a second non-limiting aspect of the present invention, an energy absorber is provided and includes a plurality of coupled beads which fixedly and operatively reside upon an elastomeric material.

According to a third non-limiting aspect of the present invention, a headliner is provided and includes a first generally surface portion which is selectively placed within the passenger compartment of a vehicle and a second and opposed surface portion upon which at least one energy absorber is selectively and operatively deployed, wherein the at least one energy absorber comprises a plurality of coupled beads which are operatively deployed upon an elastomeric material.

According to a fourth non-limiting aspect of the present invention, a vehicular hood is provided and includes a generally curved portion which is selectively and movably disposed upon a vehicle and having a first outer surface which is exposed to the ambient environment in which the vehicle operates, wherein the hood further having an opposed and inner surface upon which an energy absorber is deployed.

According to a fifth non-limiting aspect of the present invention, an instrument panel is provided and includes a base member; an energy absorber which is operatively deployed upon the base member; and a facia member which substantially encapsulates the base member and the energy absorber.

According to a sixth non-limiting aspect of the present invention, a method for making an energy absorber is provided and includes the steps of forming a mold having a certain absorber creation portion of a certain shape; providing a plurality of beads; providing resin; mixing the beads with the resin, effective to form a relatively thin layer of resin on the beads; placing the resin coated beads in the absorber creation portion of the mold; molding the contained resin coated beads, thereby forming the contained resin coated beads into the certain shape; and curing the molded beads, thereby forming the energy absorber.

These and other aspects, features, and advantages of the present invention will become apparent from a reading of the following detailed description of the preferred embodiment of the invention, including the subjoined claims, and by reference to the following drawings.

DETAILED DESCRIPTION OF THE PREFERRED EMBODIMENT OF THE INVENTION

Figures 2, 3:
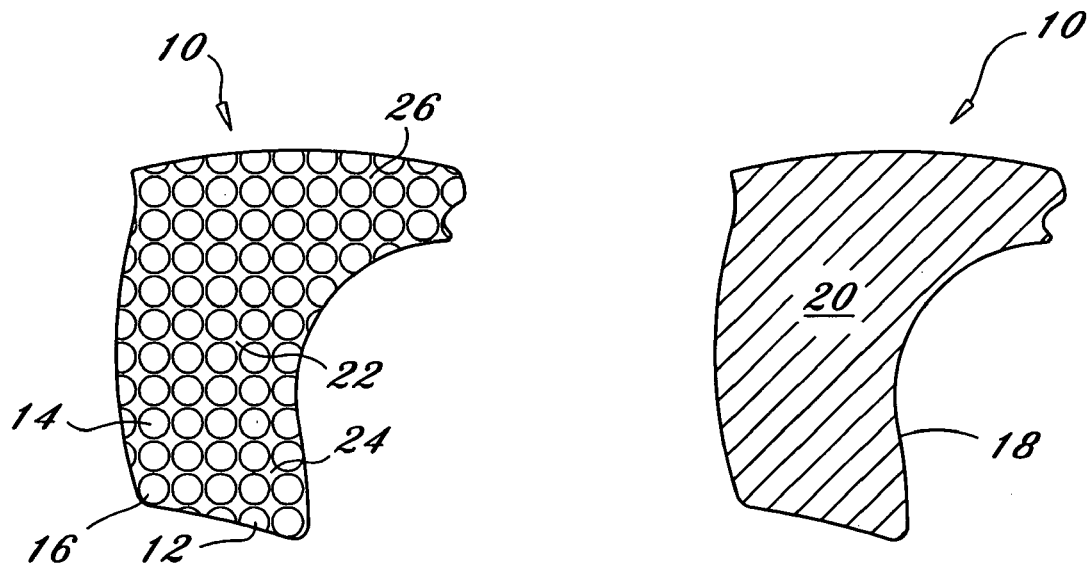
FIG. 2 is a top view of an energy absorber which is made in accordance with the teachings of the preferred embodiment of the invention.
FIG. 3 is a bottom view of the energy absorber which is shown in FIG. 2.
Figure 4:
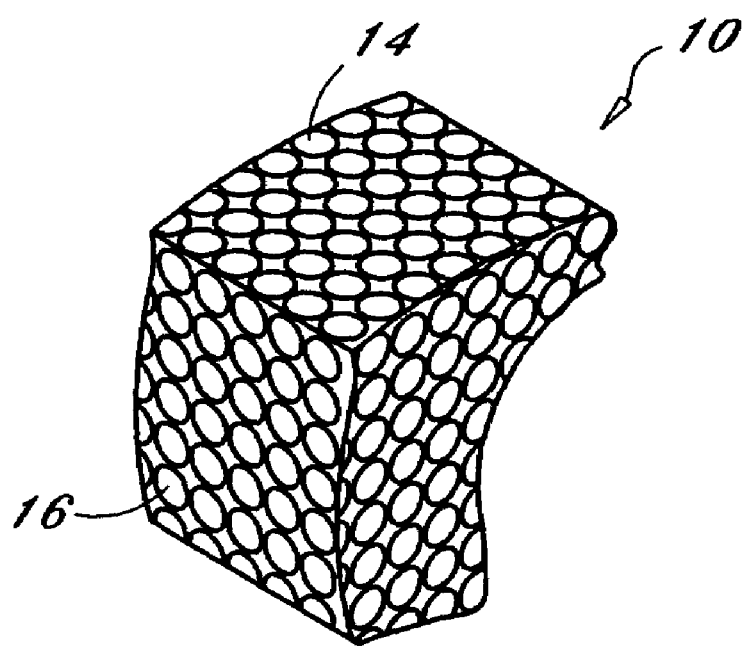
FIG. 4 is a side perspective view of the energy absorber which is shown in FIGS. 2 and 3.

Referring now to FIGS. 2–4, there is shown an energy absorber 10 which is made in accordance with the teachings of the preferred embodiment of the invention.

Particularly, it should be realized that the energy absorber 10 may be of any size, shape, and geometrical configuration and that the presently shown size, shape, and overall geometrical configuration is for illustrative purposes only and is not meant to limit the present invention in any manner whatsoever.

As shown, the energy absorber 10 includes several beads, such as beads 12, 14, and 16 which are selectively and operatively "coupled together" to form the energy absorber 10. The bottom surface 18 of the energy absorber 10, in one non-limiting embodiment of the invention, is formed from a material 20 which, in one non-limiting embodiment of the invention comprises an elastomeric material, such as polyurea or Daclar which may be commercially obtained from The LeFarge corporation and which is a water based Bituminous material. Hence, the beads, such as beads 12, 14, and 16 are fixedly coupled together and fixedly reside upon the material 20. In one non-limiting embodiment of the invention, each of the beads, such as beads 12, 14, and 16 are substantially identical and comprise ceramic beads which are commercially known as "Macrolite" beads and which may be obtained from the 3M corporation in Minneapolis, Minn. and/or from The Kinetico Corporation in Cahogoa Falls, Ohio. As further shown, the coupled beads form many crevices or interstices, such as crevices or interstices 22, 24, and 26 within the energy absorber 10. It should be appreciated that other types of beads may be used, including those made from other polymer material such as expanded polystyrene or polypropylene.

Figure 1:
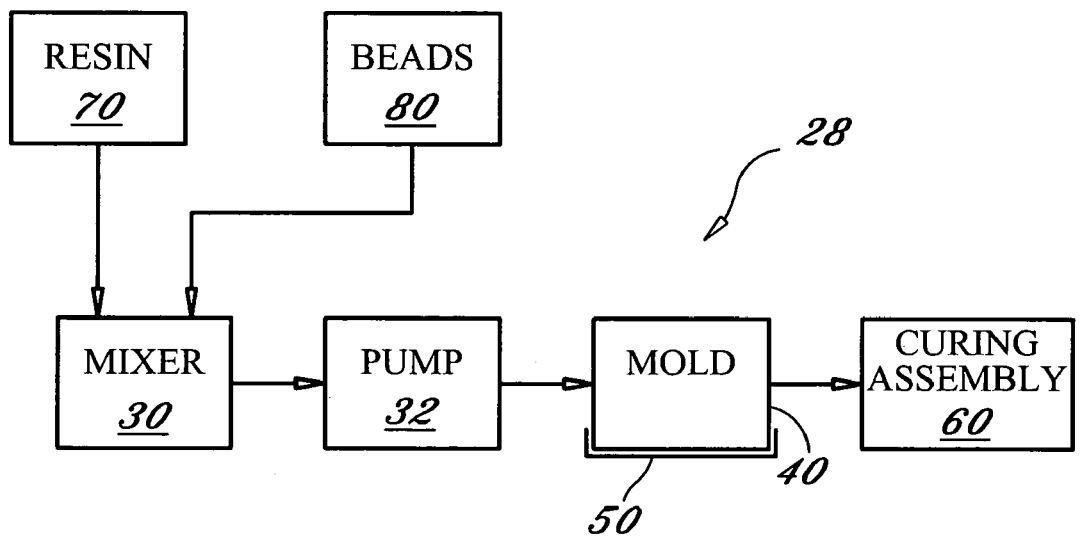
FIG. 1 is a block diagram of an energy absorber manufacturing assembly which is made in accordance with the teachings of the preferred embodiment of the invention.
Figure 11:
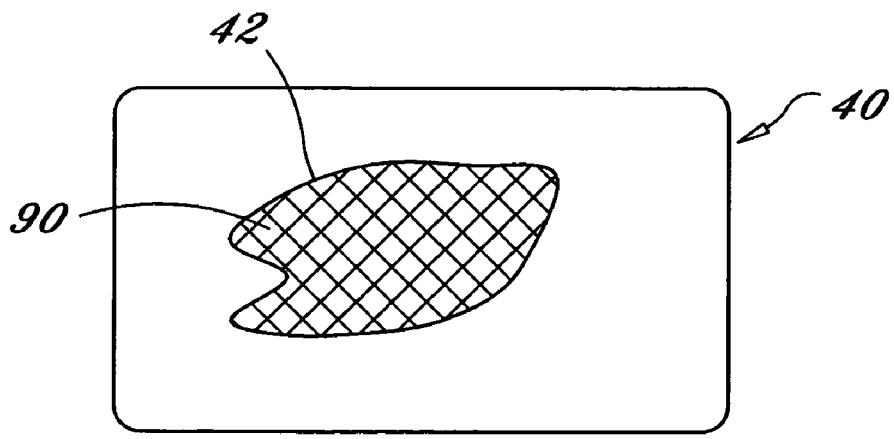
FIG. 11 is a top view of the mold which is shown in FIG. 1.

To understand the methodology involved in manufacturing the energy absorber 10, reference is now made to FIGS. 1 and 11 where energy absorber creation assembly 28 is shown.

Particularly, the energy absorber creation assembly 28 includes a mixer 30, such as a commercially available Nauto mixer or a commercially available pill coater. The mixer 30 is physically and communicatively coupled to a pump assembly 32 which may selectively comprise a progressive cavity pump which is commercially available from The Liquid Controls Corporation (Greyco). The assembly 28 further includes a mold 40, such as an open mold, having an energy absorber creation or formation portion 42. The mold 40 is coupled to a selectively movable conveyor assembly 50 which allows the mold 40 to be selectively moved to various locations. The assembly 28 further includes a curing assembly 60 which may comprise a selective heat generation assembly, such as a microwave assembly or an oven.

In the energy absorber manufacturing process, a quantity of resin 70 is selectively communicated into the mixer 30 along with a quantity of the beads 80 (the beads 80 may each be substantially identical to the beads 12, 14, and 16). Further, the resin 70 may comprise a commercially available and low viscosity polymer adhesive material, a water based epoxy material, a water based latex material, or a polyester material. The mixer 30 mixes the beads 80 and the resin material 80, thereby causing each of the received beads 70 to be substantially encapsulated with a respective and relatively thin layer of resin material 80. In one non-limiting embodiment, each layer is about 0.1 centimeters to about 0.3 centimeters thick, although other thicknesses may be employed. The mixer 30 then selectively communicates the coated beads 70 to the pump assembly 32 and the pump assembly 32 selectively communicates these coated beads 70 to the portion 42 of the mold 40. It should be appreciated that the shape of the portion 42 is made to be substantially similar to the desired shape of the produced energy absorber 10.

Further, in one non-limiting embodiment of the invention, before the coated beads 70 are received into the portion 42, a relatively thin layer (e.g., about 0.1 to about 0.3 millimeters thick) of material 90 is placed on the surface of the portion 42. The thickness of the deposited material 90 may vary as desired. In one non-limiting embodiment of the invention, the material 90 comprises polyurea, Daclar, or substantially any other desired elastomeric material which may be commercially available.

After the beads 70 are placed within the portion 42, in one non-limiting embodiment of the invention, the selectively disposed beads 70 are selectively compressed within the portion 42 (e.g., selectively "patted down") and moldably formed, within the portion 42, into the shape of the energy absorber 10. This molding operation causes the material 90 to adhere to the bottom surface of the beads 70 (see, for example, FIG. 3) and causes the beads 70 to be coupled together, thereby forming the energy absorber 10. The mold 40 is then conveyed into or made to be in close proximity to the curing assembly 40 where the disposed and coated beads 70 are selectively heated, and thereby cured which allows the produced energy absorber 10 to be readily removed from the mold 50.

It should be appreciated that this curing process is relatively quick and efficient because the interstices, such as crevices 22, 24, and 26, formed by the coupled beads 70 allows the heat, which is generated by the curing assembly 60, to quickly penetrate the beads 70 and allows moisture to readily leave the formed assembly 10 and the relatively thin coating of material 80 on these beads 70 allows the received heat to quickly dry the beads 70. In this manner, cycle time is dramatically reduced and overall manufacturing efficiency is dramatically enhanced.

Figure 5:
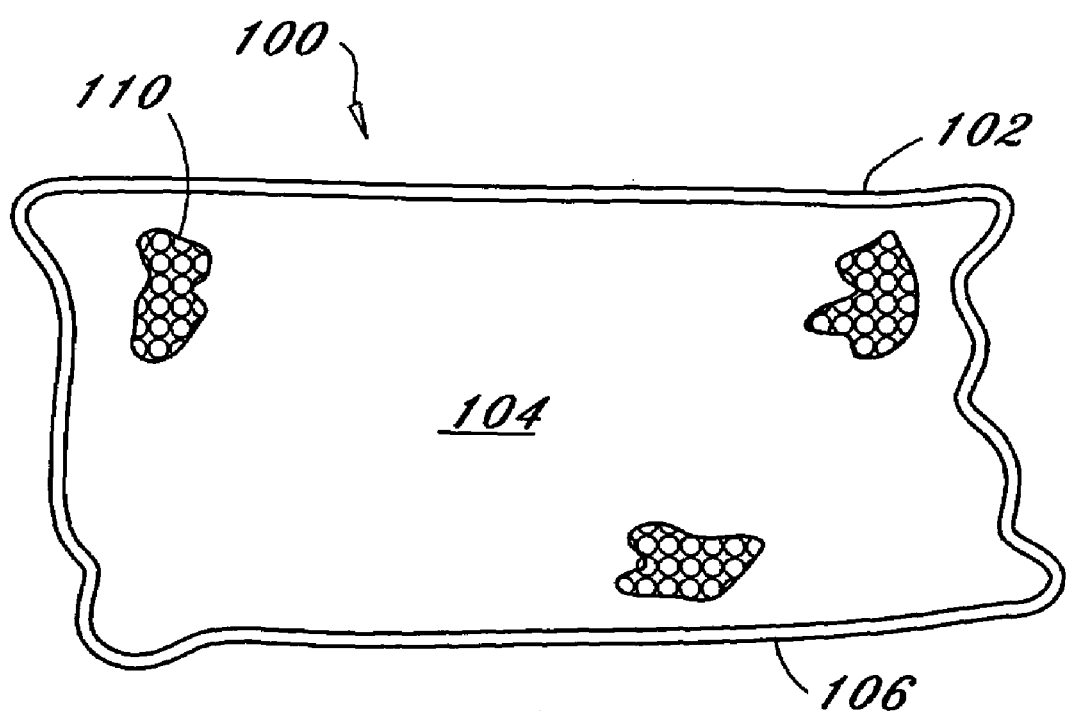
FIG. 5 is a bottom view of a vehicular headliner which is made in accordance with the teachings of the preferred embodiment of the invention.
Figure 8:
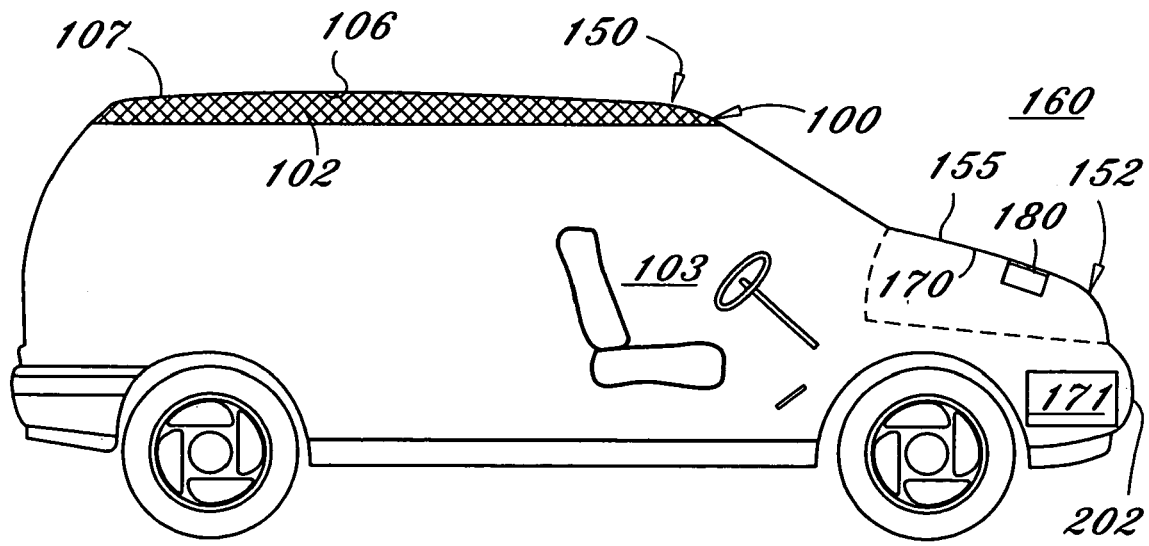
FIG. 8 is a side view of a vehicle which is made in accordance with the teachings of the preferred embodiment of the invention and including an energy absorber of the present invention which is shown in phantom.

The produced energy absorber 10 may be selectively and operatively deployed within and/or upon a large amount of diverse items. Reference is now made to FIGS. 5 and 8, where there is shown a vehicle headliner 100 which is made in accordance with, the teachings of the preferred embodiment of the invention.

Particularly, the headliner 100 includes a first surface 102 which is adapted to be disposed within the passenger compartment 103 of a vehicle, such as vehicle 150, and a second and opposed surface 104 which is adapted to be selectively disposed between the roof 107 of a vehicle, such as vehicle, 150 and the surface 102. It should be appreciated that the perimeter portion 106 of the headliner 100 cooperates with the vehicle, such as vehicle 150, to allow the foregoing assembled arrangement (e.g., the perimeter portion 106 is attached to the frame portion (not shown) of the vehicle, such as vehicle 150).

According to the teachings of the invention, at least one and possibly several energy absorbers, such as energy absorber 110 (which may be substantially similar to energy absorber 10) may be selectively attached to the surface 104 (by glue or other conventional attachment strategies) and such energy absorbers 110 absorb the energy generated by the impact of an individual (e.g., the head of an individual) to the surface 102 which may occur, by way of example and without limitation, in a rollover type of accident or event. In this situation, the beads 70 readily compress or are crushed and effectively protect the head or other portion of the individual who contacts the headliner 100.

Figure 6:
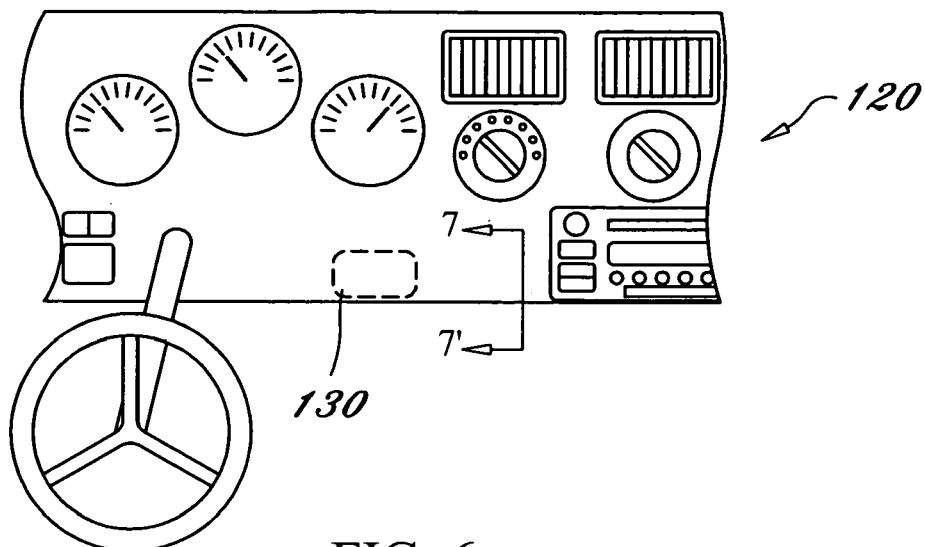
FIG. 6 is a partial perspective view of a vehicular instrument panel which is made in accordance with the teachings of the preferred embodiment of the invention and including an energy absorber of the present invention which is shown in phantom.
Figure 7:
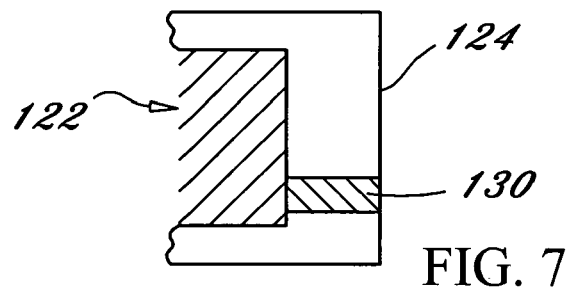
FIG. 7 is a partial sectional view of the vehicular instrument panel which is shown in FIG. 6 and which is taken along view line 7–7'.

Reference is now made to FIGS. 6 and 7 where a vehicle instrument panel 120 is shown. Particularly, the instrument panel 120 includes a base or structural member 122 and facia or a "trim" type member 124 which substantially encapsulates the member 122 and provides an overall pleasing appearance to the passengers of a vehicle. According to the teachings of the present invention, at least on energy absorber 130, which may be substantially similar to the energy absorber 10, is operatively deployed between and coupled to the member 122 and the trim portion 124 and provides absorption in the area of the instrument panel 120 which is proximate to the knee of a driver or other occupant of a vehicle. In this manner, the deployed energy absorber 130 readily absorbs and cushions the impact of a knee or other portion of the body of an individual, thereby preventing or reducing the liklihood of injury.

Figure 9:
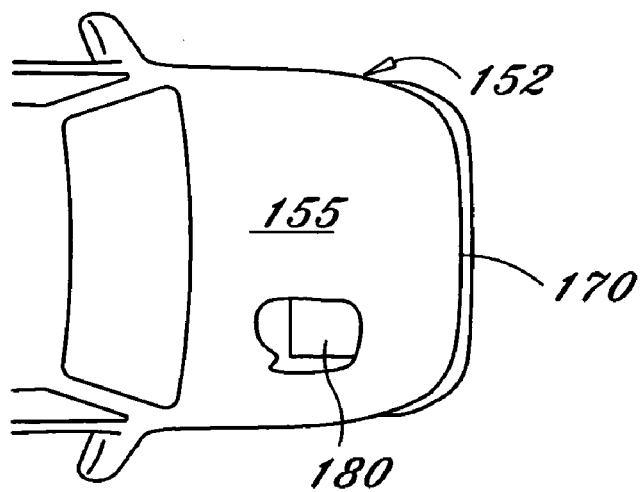
FIG. 9 is a bottom view of the hood portion of the vehicle which is shown in FIG. 8.

Reference is now made to FIGS. 8 and 9, where there is shown a vehicle 150 having a hood 152. Particularly, according to the teachings of the present invention, the hood 152 is movably disposed upon the vehicle 150 in a conventional manner and includes a first surface 155 which provides a pleasing overall appearance to those in close proximity to the vehicle 150 and which is deployed in the ambient environment 160 that the vehicle 150 resides. The hood 152 also has an under surface or portion 170 which forms an opposite surface form surface 155, is typically hidden form view, and is normally disposed in close proximity to an engine 171. Upon this surface 170, an energy absorber 180 (which may be substantially similar to energy absorber 10) is operatively disposed (e.g., glued to the surface 170 or attached to the surface 170 by other conventional techniques and strategies). In this manner, the energy absorber 180 absorbs the energy generated by the impact of a person upon the hood 152.

Figure 10:
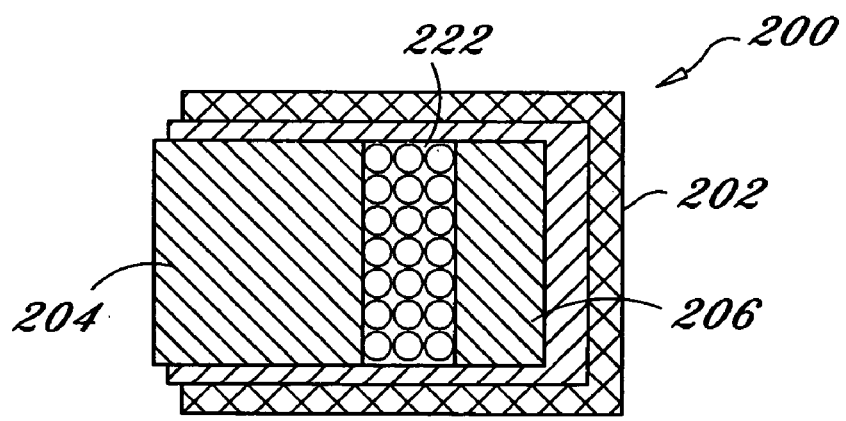
FIG. 10 is a partial side sectional view of a bumper assembly which is made in accordance with the teachings of the preferred embodiment of the invention.

Reference is now made to FIG. 10, where there is shown a bumper assembly 200 and which typically includes a fascia or trim portion 202 which provides a pleasing overall visible appearance to those in close vicinity to a vehicle, such as vehicle 150. Typically, the bumper assembly 200 includes a beam member 204 (e.g., made from steel or other materials) which substantially extends along the width of the vehicle 150 and a foam member 206 which is typically linearly coextensive to the beam member 204 and which is typically attached to the beam member 204. The trim portion 202 typically encapsulates the beam member 204 and the foam member 206. According to a first embodiment of the invention, an energy absorber 222, which may be substantially similar in structure but not in shape to the energy absorber 10, is provided and is made to be linearly coextensive to and is attached to the beam member 204 and the facia member 202. In this first non-limiting embodiment of the invention, this energy absorption member 222 replaces the foam member 206. In a second non-limiting embodiment of the invention, the energy absorber member 222 is operatively "sandwiched" between and coupled the beam member 204 and the foam member 206 and provides greatly enhanced energy absorption capabilities.

It is to be understood that the foregoing inventions are not limited to the exact construction or methodology which has been delineated in this description, but that various changes and modifications may be made without departing from the spirit and the scope of the inventions as are more fully defined in the following claims. Hence, it should be appreciated that the foregoing energy absorbers, such as energy absorber 10, may be readily constructed to provide optimal absorption capabilities by causing the size of the deployed beads 70 to be larger, and/or causing the amount or density of the deployed beads 70 to increase, thereby increasing the absorption capability of the absorber, such as energy absorber 10.

Further, in one non-limiting embodiment, the size, shape, and geometric configuration of all of the deployed heads 70 is substantially identical, but in another embodiment beads of different sizes, shapes, and geometric configurations are utilized. For example, a portion of the absorber may have large beads or densely populated beads 70 while a second portion of the absorber may not be as densely populated or may include smaller beads. The first portion is therefore deployed in a known "high impact" area, while the second portion of the same absorber may be deployed in a lower impact area. In these manner, an absorber may be "programmed" or selectively created to desirably control the energy management between two substrates or surfaces by providing a selectively crushable honeycombed media (e.g., the coupled beads 70) that has a geometric configuration that can be tailored for force and crush energy levels. Further, it should be appreciated that the previously delineated energy, absorber, such as energy absorber 10, is heat intolerant or resistant and thus may be selectively and operatively deployed in "hot" environments, such as near an engine, and may also be operatively deployed upon/within many diverse items. Further, because the beads 70 are "non-oil based", the absorber, such as absorber 10 has a greatly reduced manufacturing cost relative to that associated with current energy absorbers.

What is claimed is:

1. A vehicle headliner assembly for use in combination with a vehicle of the type having a roof, said vehicle headliner assembly comprising a vehicular headliner member having a first surface which is disposed within a passenger compartment of a vehicle and a second opposed surface which resides under said roof and which is hidden from said passenger compartment; and at least one energy absorption member having an elastomeric base portion which includes a first flat and smooth surface which is devoid of any lattice structure and recess and a second and opposed flat and smooth surface which is devoid of any lattice structure and recess, said at least one energy absorption member farther including a plurality of beads which are each encapsulated by a resin material and which have been molded onto said first flat and smooth surface of said elastomeric base portion and which have been cured only after they have been molded onto said first flat and smooth surface of said elastomeric base portion, thereby being coupled together, and wherein said second flat and smooth surface of said energy absorption member is devoid of any of said beads and is attached to said second opposed surface of said vehicle headliner member, thereby causing said plurality of beads to reside between said roof and said second opposed surface of said vehicle headliner and wherein each of said plurality of beads is made to contact at least one other of said plurality of beads in order to cooperatively form a plurality of spaces.

2. The vehicle headliner assembly of claim 1 wherein said plurality of coupled beads comprises ceramic beads.

3. The vehicle headliner assembly of claim 1 wherein each of said plurality of coupled beads is substantially identical.

4. The vehicle headliner assembly of claim 2 wherein each of said plurality of coupled beads has a thin coating of a certain material.

5. The vehicle headliner assembly of claim 4 wherein said certain material comprises a polymer adhesive material.

6. The vehicle headliner assembly of claim 4 wherein said certain material comprises a water based epoxy material.

7. The vehicle headliner assembly of claim 4 wherein said certain material comprises a polyester material.

* * * * *